United States Patent
Sanwald et al.

(10) Patent No.: US 10,102,407 B2
(45) Date of Patent: Oct. 16, 2018

(54) METHOD FOR GENERATING A UNIQUE PACKAGE IDENTIFIER BASED ON PHYSICAL PROPERTIES OF A PACKAGE

(71) Applicant: Robert Bosch GmbH, Stuttgart (DE)

(72) Inventors: Daniel Sanwald, Auenwald (DE); Jorge Guajardo Merchan, Pittsburgh, PA (US); Andreas Müller, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/268,963

(22) Filed: Sep. 19, 2016

(65) Prior Publication Data

US 2017/0083731 A1    Mar. 23, 2017

Related U.S. Application Data

(60) Provisional application No. 62/221,333, filed on Sep. 21, 2015.

(51) Int. Cl.

| G06F 19/00 | (2018.01) |
|---|---|
| G06K 7/10 | (2006.01) |
| G06K 19/06 | (2006.01) |
| G06Q 10/08 | (2012.01) |
| G06K 9/00 | (2006.01) |
| G06K 9/20 | (2006.01) |
| G07D 7/0047 | (2016.01) |

(52) U.S. Cl.
CPC ..... *G06K 7/10861* (2013.01); *G06K 9/00577* (2013.01); *G06K 9/2063* (2013.01); *G06K 19/06037* (2013.01); *G06Q 10/083* (2013.01); *G07D 7/0047* (2017.05)

(58) Field of Classification Search
CPC ............. G06K 9/00577; G06K 9/2063; G06K 7/10861; G06K 19/06037; G07D 7/2041; G07D 7/0026; G07D 7/0047; G06Q 10/083
USPC .......................................................... 235/385
See application file for complete search history.

(56) References Cited

U.S. PATENT DOCUMENTS

| 7,035,428 | B1 | 4/2006 | Smith |
|---|---|---|---|
| 7,251,347 | B2 | 7/2007 | Smith |

(Continued)

FOREIGN PATENT DOCUMENTS

| WO | 2006120643 A1 | 11/2006 |
|---|---|---|
| WO | 2008153503 A1 | 12/2008 |
| WO | 2015/047977 A1 | 4/2015 |

OTHER PUBLICATIONS

Metois, E. et al., "Fiberfingerprint Identification", In Third Workshop on Automatic Identification, Mar. 14-15, 2002.

(Continued)

*Primary Examiner* — Claude J Brown
(74) *Attorney, Agent, or Firm* — Maginot Moore & Beck LLP

(57) ABSTRACT

A method for generating a package identifier includes generating an image of a portion of a surface of a substrate of the package, generating a serial number of the package from the image, the serial number being based on at least one surface feature of the portion of the surface, and affixing a visual indicator on the package that is based on the serial number. The visual indicator affixed on the package is therefore based on the at least one surface feature of the package.

4 Claims, 5 Drawing Sheets

(56) References Cited

U.S. PATENT DOCUMENTS

| | | | |
|---|---|---|---|
| 8,090,632 B1 | 1/2012 | Ortiz et al. | |
| 8,171,567 B1* | 5/2012 | Fraser | G06T 1/0021 |
| | | | 713/176 |
| 2007/0028093 A1 | 2/2007 | Cowburn et al. | |
| 2008/0219503 A1* | 9/2008 | Di Venuto | G06K 9/00577 |
| | | | 382/103 |
| 2008/0226297 A1* | 9/2008 | Sinclair | G06K 19/086 |
| | | | 398/139 |
| 2009/0033914 A1* | 2/2009 | Doublet | D21H 21/40 |
| | | | 356/71 |
| 2009/0257619 A1* | 10/2009 | Boutant | G06K 19/06046 |
| | | | 382/100 |
| 2010/0007930 A1* | 1/2010 | Cowburn | G07D 7/2033 |
| | | | 358/488 |
| 2010/0327060 A1* | 12/2010 | Moran | G06K 7/0004 |
| | | | 235/440 |
| 2011/0194737 A1 | 8/2011 | Sharma et al. | |
| 2012/0280043 A1* | 11/2012 | Roseman | G06K 19/06009 |
| | | | 235/488 |
| 2013/0105568 A1* | 5/2013 | Jablonski | G06Q 50/24 |
| | | | 235/375 |
| 2013/0173484 A1* | 7/2013 | Wesby | G06Q 30/06 |
| | | | 705/318 |
| 2013/0212027 A1* | 8/2013 | Sharma | G06Q 40/02 |
| | | | 705/71 |
| 2013/0287263 A1* | 10/2013 | Wei | G06K 9/00147 |
| | | | 382/108 |
| 2013/0320087 A1* | 12/2013 | Moran | G06K 19/06037 |
| | | | 235/440 |
| 2014/0086474 A1* | 3/2014 | Le | G06K 9/00577 |
| | | | 382/141 |
| 2014/0140570 A1* | 5/2014 | Ross | G06K 9/00577 |
| | | | 382/100 |
| 2014/0201094 A1* | 7/2014 | Herrington | G06K 9/00577 |
| | | | 705/317 |
| 2014/0205153 A1* | 7/2014 | Sharma | G06K 9/00577 |
| | | | 382/109 |
| 2015/0154760 A1* | 6/2015 | Ishiyama | G06K 9/00577 |
| | | | 382/203 |
| 2016/0232734 A1 | 8/2016 | Guajardo Merchan et al. | |

OTHER PUBLICATIONS

Sharma, A., et al. "PaperSpeckle: Microscopic Fingerprinting of Paper", In Proceedings of the 18th ACM Conference on Computer and Communications Security (CCS 2011) ACM, 2011, New York, NY, USA pp. 99-110.

Zhu, B. et al., "Print Signatures for Document Authentication", in Proc. 10th ACM Conference on Computer and Communications Security, 2003, pp. 145-154.

Buchanan, J. et al., "Forgery: 'Fingerprinting' Documents and Packaging", Nature, vol. 436, p. 475, 2005.

Smith, Joshua R. et al., Microstructure Based Indicia, Proceedings of AutoID'99, Oct. 28-29, 1999, Summit New Jersey.

Clarkson, William et al., Fingerprinting Blank Paper Using Commodity Scanners, 30th IEEE Symposium on Security and Privacy, May 2009.

International Search Report corresponding to PCT Application No. PCT/EP2016/072303 (5 pages).

Haist et al., "Optical detection of random features for high security applications", Optics Communications, North-Holland Publishing Co., Amsterdam, NL, vol. 147, No. 1-3, Feb. 1, 1998 (7 pages).

* cited by examiner

METHOD FOR GENERATING A UNIQUE PACKAGE IDENTIFIER BASED ON PHYSICAL PROPERTIES OF A PACKAGE

CROSS REFERENCE TO RELATED APPLICATIONS

This application claims priority to U.S. Provisional Application No. 62/221,333, which is entitled "Method for Generating a Unique Package Identifier Based on Physical Properties of a Package," and was filed on Sep. 21, 2015, the entire contents of which are hereby incorporated by reference.

This application cross-references related U.S. Provisional Patent Application No. 61/881,809, which is entitled "System and Method for Document and Article Authentication," and was filed on Sep. 24, 2013, the entire contents of which are hereby incorporated by reference.

This application further cross-references related International Patent Application No. PCT/US2014/056883, which is entitled "System and Method for Document and Article Authentication," and was filed on Sep. 23, 2014, the entire contents of which are hereby incorporated by reference.

TECHNICAL FIELD

This disclosure relates generally to authentication systems, and more particularly to package authentication systems.

BACKGROUND

The surface of a substrate, for example paper or cardboard, consists of an interwoven web of wood fiber. This web of interwoven fibers is visible when looking through the paper with an illuminated background. The patterns formed within the web of wood fiber are largely random, which causes each different substrate, for example each sheet of paper, to have a unique microstructure. This unique microstructure cannot be replicated from the substrate, thereby giving each substrate a unique identity.

The possibility of identifying each document uniquely, paves the way for authentication of products, documents, objects and articles by analyzing inhomogeneous and 'random' microstructures of the paper, also known as the "signature" of the product, document, object, or article. Since the signature contains the document's unique characteristics, it cannot be transferred to other documents, and this data cannot be easily stolen or given away to others.

Authenticating the unique identity of documents provides security for the consumer and protection for the manufacturer. The problem of counterfeiting is much more relevant in today's world than it has been at any time in the past. Counterfeit duplication of documents has grown in all industries, including the health industry, financial industry, and safety industry. With advancement in counterfeiting technologies, particularly the increased resolution and reduced cost of scanning and printing technologies, the counterfeiting problem is rapidly increasing.

Currently, there are numerous systems for authenticating documents, ranging from techniques that attempt to measure the randomness of ink splatters made by a printer to extract a unique sign, or measure randomness of fiber structure, to use of scanners to model 3D fiber structure, or lasers to model surface scattering, or use microscope to capture texture information from document.

One particular authentication technology, known as "Fiberfingerprint" technology, employs custom based device to authenticate documents by capturing naturally occurring irregularities of a substrate as a means to discriminate between various documents or objects. The system uses registration marks to identify the area of the medium that should be analyzed. For imaging, a consumer-grade video module and lens, along with the appropriate lighting apparatus, is used to capture the analysis area, which is stored to an online server. To authenticate the document, the analysis area is imaged with a laser microscope to capture the irregularities, and the imaged area is compared with the image stored on the online server. Laser surface authentication technology, however, requires an expensive laser microscope and special imaging setup to capture irregularities in paper, which might restrict its usage among users. Additionally, the Fiberfingerprint technology requires the verifier to be online to match the signature, which limits the utility and the locations at which the technology can be used.

Another conventional authentication technology utilizes scanner technology for document authentication. For example, mid-range scanners can be used to model the three-dimensional (3D) fiber structure of a paper and generate unique fingerprints based on it. The original document is scanned several times at different orientations to produce an estimate for the 3D surface texture of the document. The features obtained are reduced to a concise feature vector, which is encrypted and printed on the document. This scanning technology is robust, but requires use of bulky equipment, which restricts portability of the system. Another conventional scanning authentication technology uses a commodity scanner and laser to identify documents. Such a system is less robust than the 3D scanning technology, but is still not very portable.

Another conventional authentication system, known as "PaperSpeckle," leverages the natural randomness property present in paper to generate a fingerprint for any piece of paper. The phenomena of multiple scattering of partially coherent light (natural light) from the complex microscopic structure (surface irregularities and particles) of the paper region is captured using a microscope to obtain the texture speckle pattern and use this information to produce a unique fingerprint of a region of the document. The Gabor transform and a Singular Value Decomposition (SVD) are used to obtain eigenvalues (or singular values) of the Gabor transformed speckle and generate a fingerprint for a speckle pattern. The PaperSpeckle system, however, requires a microscope, which is not readily available to an end user. Moreover, the requirement of a microscope significantly increases the cost of the verification system.

Other conventional authentication systems include securing products using special inks, anti-copying visible patterns, or embedded holograms or microtext. A document fingerprint can be produced from the random ink splatter that occurs around the edges of any features printed on a page. Given a document to be protected, the secure pattern is printed onto a blank area of the paper. Additionally, several auxiliary landmarks may also printed around the pattern to facilitate alignment. The authentication then requires examination by a microscope. One problem with this this approach is that it can only be applied after a document has been printed. Moreover, this method requires modification of original document for printing a predetermined pattern. Additionally, the method also requires use of microscope, which, as discussed above, may not be available and can be expensive for the end user.

Most of the conventional techniques discussed above are expensive, for example requiring expensive equipment to perform a validation of a document. As a result, the applications for which these methods can be used are restricted, and may not be available in certain locations or industries due to prohibitive costs. Moreover, some of these authentication technologies require modifications of the product, which are generally not desirable. What is needed, therefore, is a robust authentication system that minimally modifies the product, does not require expensive equipment, and is widely usable in a variety of applications.

SUMMARY

In one embodiment according to the disclosure, a method for generating a package identifier comprises generating an image of a portion of a surface of a substrate of the package, generating a serial number of the package from the image, the serial number being based on at least one surface feature of the portion of the surface, and affixing a visual indicator on the package that is based on the serial number.

In some embodiments, the method further comprises determining a feature vector from the image, the feature vector corresponding to the at least one surface feature of the portion of the surface, and the generating of the serial number includes generating the serial number based on the feature vector.

In another embodiment according to the disclosure, the generating of the serial number further comprises generating a hash of the feature vector.

In yet another embodiment, the affixing of the visual indicator on the package comprises printing the visual indicator on the package.

In some embodiments, the visual indicator is a two-dimensional barcode.

In another embodiment, the method includes determining error correcting information based on the generated image and the at least one surface feature.

In yet another embodiment, the method includes transmitting the serial number, the image, and the error correcting information to a database.

In another embodiment according to the disclosure, a system for generating a package having a package identifier includes a camera, a printer, and a processor operably connected to the camera and the printer. The processor is configured to execute program instructions stored in a memory to receive an image of a portion of the surface of the substrate of the package from the camera, generate a serial number for the package from the image, the serial number being based on at least one surface feature of the portion of the surface, and operate the printer to print a visual indicator that is based on the serial number onto the package.

In one embodiment of the system, the visual indicator is a two-dimensional barcode.

In some embodiments of the system, the processor is further configured to determine a feature vector from the image, the feature vector corresponding to the at least one surface feature of the portion of the surface, and the processor is configured to generate of the serial number based on the feature vector.

In another embodiment of the system, the processor is further configured to generate the serial number by generating a hash of the feature vector.

The processor, in some embodiments of the system, is further configured to determine error correcting information based on the generated image.

In one embodiment of the system, the processor is further configured to determine the serial number based on a hash of the feature vector in combination with the error correcting information.

In further embodiments, the processor is further configured to transmit the serial number, the error correcting information, and at least one of the image and the feature vector to a database.

In some embodiments of the system, the database is configured to derive the serial number of the package from one of (i) the error correction data and (ii) the error correction data in combination with the feature vector.

In another embodiment according to the disclosure, a package comprises a substrate having a surface with an identification portion and a serial number attached to the package, the serial number being based on at least one surface feature in the identification portion.

In some embodiments, the package is sealed such that opening the package damages the at least one surface feature in the identification portion.

In further embodiments of the package, the first serial number is printed on the package.

The package, in some embodiments, further comprises a plurality of sub-packages packed inside the package, each sub-package including a second surface with a respective second identification portion. The first serial number is further based on at least one second surface feature of each of the respective second identification portions of the plurality of sub-packages.

In another embodiment of the package, each of the plurality of sub-packages includes a second serial number attached to the sub-package, the second serial number being based on the respective second identification portion of the sub-package.

DETAILED DESCRIPTION

Figure 1:
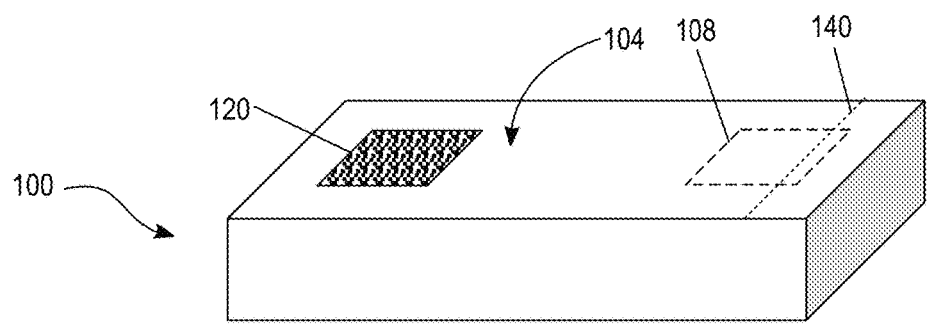
FIG. 1 is a side perspective view of a package according to the disclosure having an identification portion and a barcode based on surface features of the identification portion.

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As used herein, the term "trusted party" refers to a party that is privy to the critical transaction communications between parties. The trusted party is typically a third-party that is not a part of the transaction between the content manufacturer and the end-consumer.

As used herein, the term "untrusted party" is a party that handles or produces the goods, but is not privy to the critical transaction communications between the parties. The untrusted party may, for example, produce the product, encode information on the product, or verify the product, but is not privy to the algorithm or code used to verify the product.

As used herein, the term "package manufacturer" refers to the manufacturer of the package or the manufacturer of the package machine. The role of this party is to provide the package and/or the means to process it. From the end-user or verifier's point of view, however, the package manufacturer or package machine manufacturer is considered an untrusted party. In the present specification, the term "package manufacturer" is used interchangeably to refer to both the actual package manufacturer and the package machine manufacturer.

As used herein, the term "content manufacturer" refers to the manufacturer of the goods that are enclosed in the package. By way of example, the content manufacturer may be a pharmaceutical company that manufactures a pharmaceutical product, a grocery store that packages its own products, a food manufacturer that manufactures a food product and sells it to a grocery store for final sales to the end-consumer, a cosmetic manufacturer, or the like. The content manufacturer may be a trusted party or an untrusted party, depending on whether the content manufacturer has been certified to be trusted by a certificate authority.

As used herein, the term "certificate authority" refers to an actor that certifies as to the authenticity of the contents in the package. In some instances, the certificate authority may be the same as the content manufacturer, while in other instances the certificate authority is a third-party entity that provides the means to certify to the authenticity of the contents of the package. The certificate authority is considered a trusted party.

As used herein, the term "distributor" refers to a party that transports the packaged content from the manufacturer premises to the retailer premises. The reader should appreciate that, although the distributor is identified as a single party, in practice there may be multiple distributors between the manufacturer and the retailer. A distributor is always considered an untrusted party.

As used herein, the term "retailer" refers to a party that sells or makes available the packaged goods, typically for a profit. By way of example, the retailer may include a grocery store, a pharmacy, a hospital, a medical doctor, and the like. In some instances, a retailer may be a semi-trusted party, though in other instances the retailer is considered an untrusted party.

As used herein, the terms "end-consumer" and "consumer" refer to the party that receives the packaged goods from the retailer and is interested in verifying that the packaged content originated with the content manufacturer, as certified by the certification authority, and is not a counterfeit product. The end-consumer is not necessarily a trusted party.

FIG. 1 illustrates a side perspective view a package 100 according to the disclosure. The package 100 is shaped as a rectangular prism having six sides, though the reader should appreciate that the package may have other shapes in different embodiments. The package 100 includes an authentication surface 104, which, in the illustrated embodiment is the top surface, though the orientation of the package 100 and the authentication surface 104 may be different in other embodiments.

A portion of the authentication surface 104 forms an identification portion 108, which, as discussed in detail below, is used to authenticate the package. The identification portion 108 may be formed of paper, cardboard, or another suitable substrate material. The identification portion 108 has a random or substantially random array of fibers forming the substrate. In some embodiments, the identification portion 108 is formed of a different material than the main body of the package 100 or of the remainder of authentication surface 104, while in other embodiments the identification portion 108 is formed of the same material as the body of the package 100 and the remainder of the authentication surface 104.

The package 100 also includes a barcode 120 printed or otherwise affixed to a surface of the package 100. In one embodiment, the barcode 120 is printed on the authentication surface 104, though the reader should appreciate that in other embodiments the barcode is printed or otherwise affixed to a different surface of the package 100 than the identification portion 108. In one embodiment, the barcode 120 is a two-dimensional binary barcode, for example Data Matrix, QR Code, or Aztec Code, while in other embodiments the barcode 120 may be a base64 string or other encoded format. As discussed in detail below, the barcode 120 is based on the surface features present in the identification portion 108 of the authentication surface 104.

Figure 2:
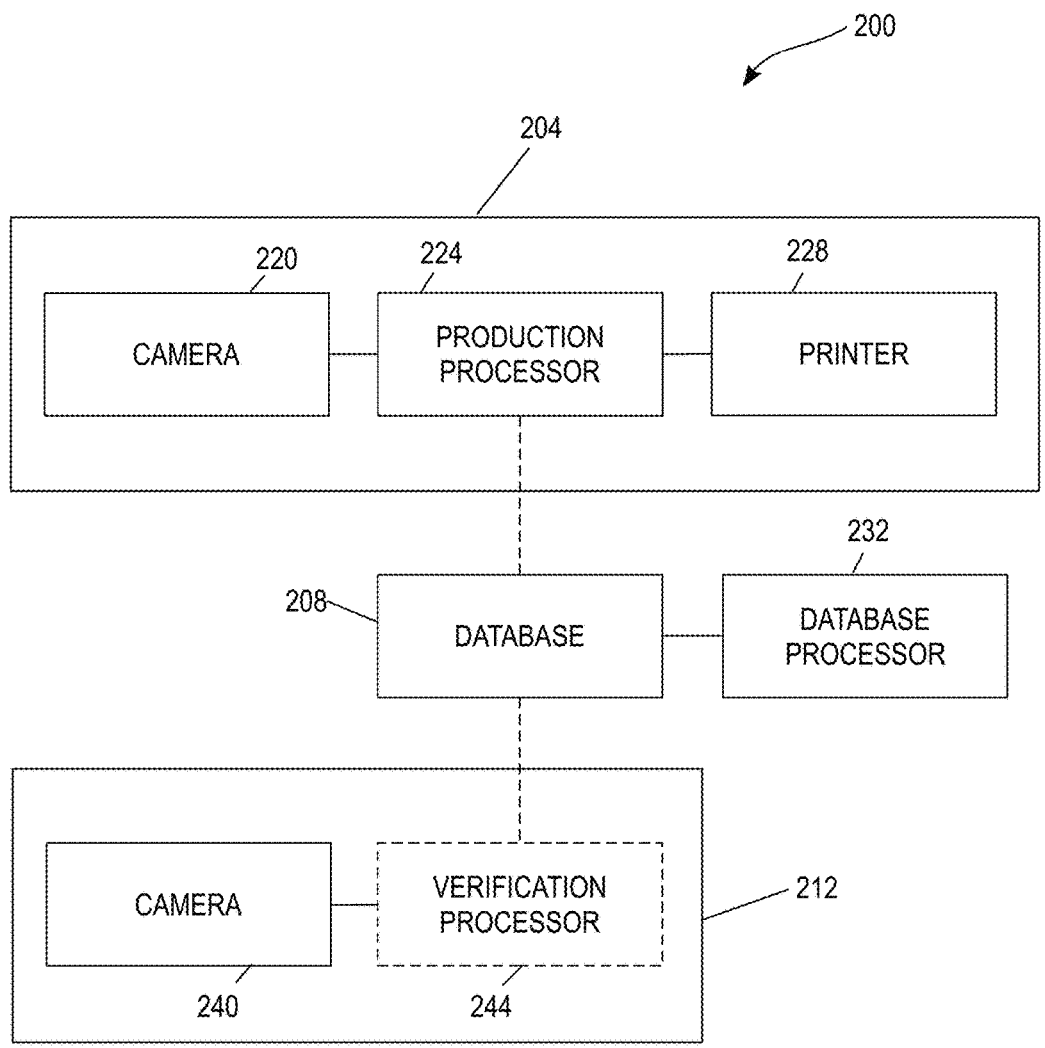
FIG. 2 is a schematic view of a system according to the disclosure for generating a unique identifier for a package, storing the identifier, and validating the package.

The authentication features of the package 100 are generated and verified by a system 200 illustrated schematically in FIG. 2. The system 200 includes a production portion 204, a database 208, and a verification portion 212. The production portion 204 includes a camera 220 (also referred to herein as the production camera), a processor 224 (also referred to herein as the production processor), and a printer 228. As is discussed in further detail below, the camera 220 is configured to generate a digital image of the identification portion 108, which the processor 224 converts into the serial number and operates the printer 228 to print the barcode 120 representing the serial number on the package 100. In one embodiment, the production camera 220 is a conventional consumer-available camera, for example a digital camera, a cellular phone camera, and the like. The production portion 204 may also include, in some embodiments, at least one memory (not shown) in which the image, the feature vector, the serial number, and/or other data are temporarily or permanently stored.

The production processor 224 is configured to execute program instructions stored in a memory to perform the processes described in detail below. The production processor 224 is, for example, a digital microprocessor that includes one or more central processing unit (CPU) cores and optionally one or more graphical processing unit (GPU) units, digital signal processors (DSPs), field programmable gate arrays (FPGAs), and application specific integrated circuits (ASICs) for processing data.

The production processor 224 is operably connected to the database 208 so as to transmit and receive data to and from the database 208. In some embodiments, the production processor 224 and the database 208 are connected via the Internet, while in other embodiments the production processor 224 and the database are connected via a wired connection or a wireless connection. The database 208 includes digital memory configured to store data based on the identification portion 108, the corresponding serial numbers, and, in some instances, error correcting data. The database 208 also includes a database processor 232, which is, for example, a digital microprocessor that includes one or more CPU cores and optionally one or more GPU units, DSPs, FPGAs, and ASICs for processing data to authenticate the package 100. In one embodiment, the database 208 is stored remotely, for example at the certificate authority, and is accessed by the package manufacturer and the end-consumer via an Internet connection. In another embodiment, the database 208 is located at the package manufacturer or the end-consumer.

The database 208 is also operably connected to the verification portion 212 of the system 200. The verification portion 212 includes a camera 240 (also referred to herein as the verification camera) and, optionally, a processor 244 (also referred to herein as the verification processor) operably connected to the camera 240. In some embodiments, the verification portion 212 is formed by a cellular phone or tablet, with the camera 240 being the camera integrated in the phone or tablet and the verification processor being the processor of the cellular phone or tablet.

The camera 240 is configured to generate an image of the identification portion 108 and the barcode 120 of the package for verification. In some embodiments the camera 240 is configured to connect to the database 208 via, for example, the Internet, to send the image and the barcode to the database 208 for verification. In other embodiments, the camera 240 is operably connected to the verification processor 244, which is configured to determine the serial number based on the image of the barcode 120 and, in one particular embodiment, derive the feature vector of the identification portion 108. The verification processor 244 is operably connected to the database 208 so as to transmit and receive data to and from the database 208.

The verification processor 244 is configured to execute program instructions stored in a memory to perform the processes described in detail below. The verification processor 244 is, for example, a digital microprocessor that includes one or more CPU cores and optionally one or more GPU units, DSPs, FPGAs, and ASICs for processing data.

Figure 3:
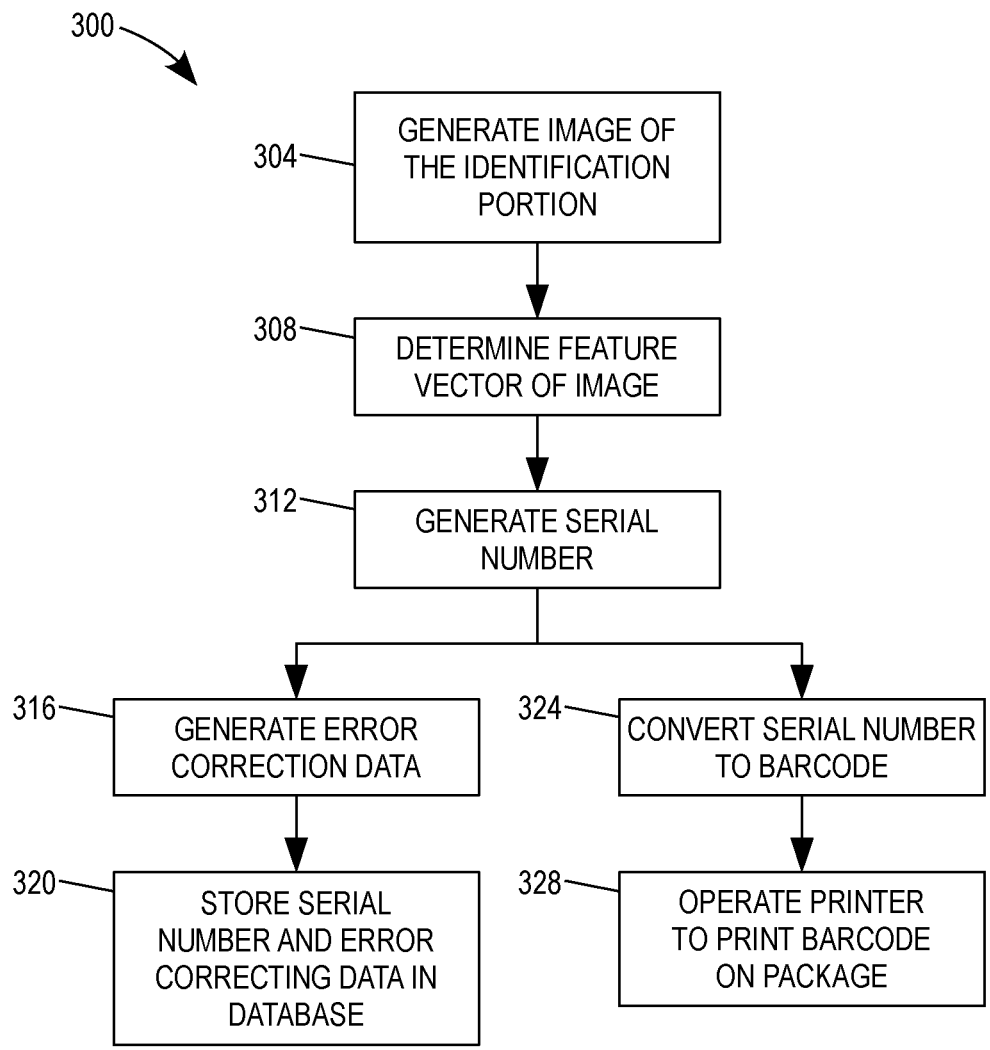
FIG. 3 illustrates a process for producing a package having a unique identifier according to the disclosure.
Figure 4:
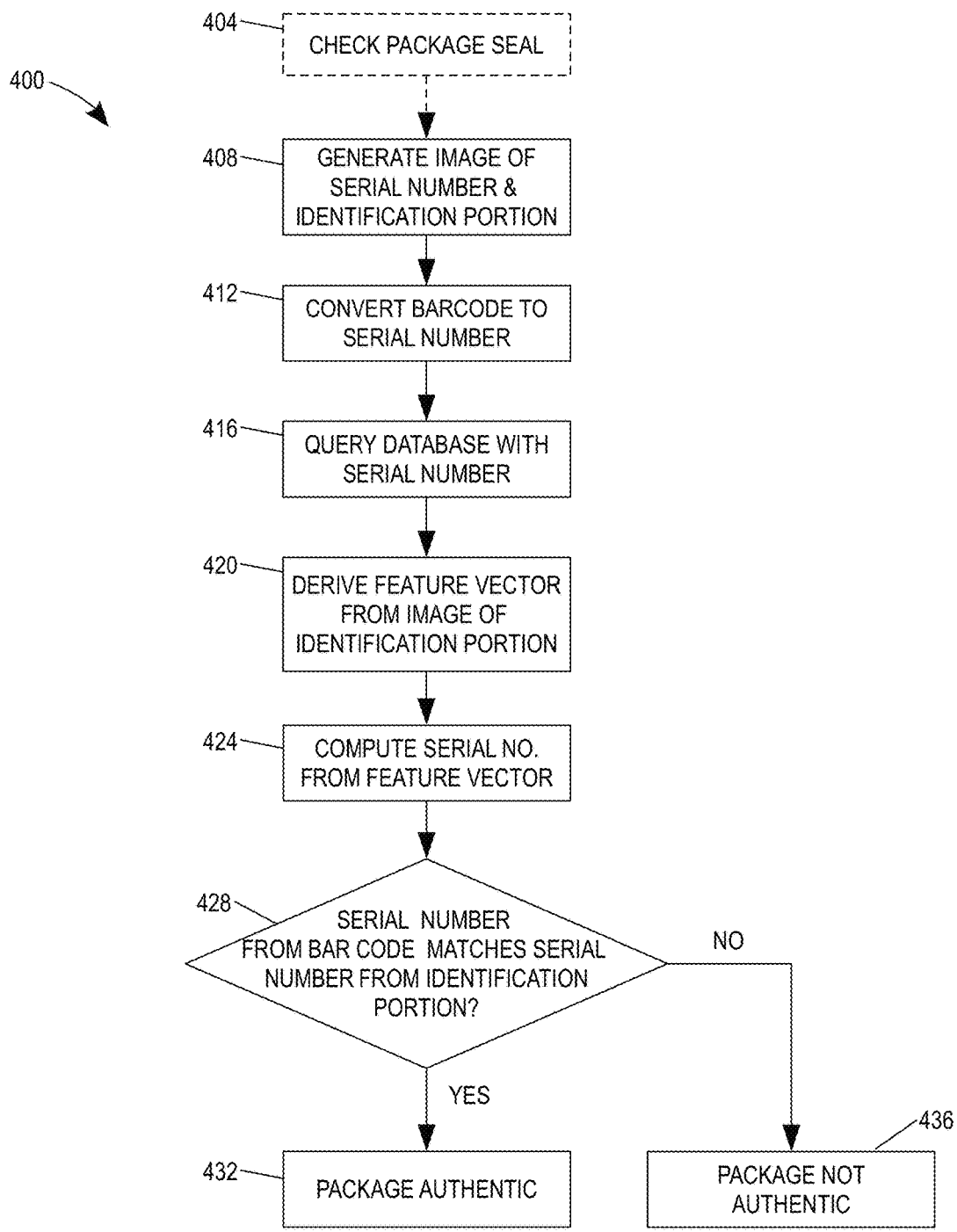
FIG. 4 illustrates a process for verifying a package according to the disclosure.

FIG. 3 illustrates a production process 300 for producing and registering the package 100 using the production portion 204 of the system 200, while FIG. 4 illustrates a verification process 400 for verifying the authenticity of the package 100 using the verification portion 212 of the system. As set forth below, a description of the process 300 performing an action or function refers to the operation of a processor, for example one of the production processor 224, the verification processor 244, and the database processor 232 to execute stored program instructions to perform the function or action in association with other components in the system. The processes 300 and 400 are described in conjunction with the package 100 of FIG. 1 and the system 200 of FIG. 2 for illustrative purposes.

The production phase process 300 begins with the production processor 224 operating the production camera 220 to generate an image of the identification portion 108 of the package 100 (block 304). The image generated by the production camera 224 depicts at least one surface feature or a plurality of surface features of the identification surface and, in particular, the fibers in the identification surface. In some embodiments, the camera 224 may be configured to illuminate the authentication surface 104 so as to generate a clear image of the identification portion 104.

Next, the production processor 224 is configured to derive a feature vector based on the image of the identification portion 108 (block 308). In one embodiment, the feature vector is a fixed-length set of binary data that is encoded based on the pixels in the image data. In another embodiment, the feature vector is a fixed-length set of decimal or hexadecimal data encoded based on the pixels in the image data. For example, each color or hue may be assigned to a particular binary, decimal, or hexadecimal character or series of characters. The feature vector therefore encodes the surface features, for example the fibers and other random elements, in the identification portion 108 that cannot be replicated in a practical manner in another package.

The production processor 224 is then configured to generate a serial number based on the feature vector (block 312). The serial number is determined by computing the hash, for example using a secure hash algorithm such as SHA-2 or SHA-3, or some other hash function, on the feature vector. Optionally, the content manufacturer may truncate the resulting digest to the number of bits required by its application. In some embodiments, the content manufacturer may add additional bits for purposes of association, for example to signify a particular company, a particular product line within the company, etc. In further embodiments, the added bits may be secret. The resulting sequence is the serial number, which may, in various embodiments, be a binary number, a decimal number, a hexadecimal number, an alphanumeric string, or other suitable identifier. The serial number is therefore based on the identification portion, in particular on the surface features such as the fibers and other random elements of the identification portion 108 of the authentication surface 104.

The production processor 224 is also configured to derive error correcting information to correct possible errors during a future measurement of the identification portion 108 that may occur as a result of image distortion or quality, light effects, or poor signal transmission (block 316). In one embodiment, the error correcting information may include a baseline pixel density, light level, and/or other suitable information. In some embodiments, the error correcting information may be based on the surface features in the identification portion 108 of the authentication surface 104.

Next, the error correction information, the serial number, and, in some embodiments, the feature vector, are transmitted to and stored in the database 208 (block 320). In some embodiments, the serial number is used to index other data associated with the package 100 in the database 208. Optionally or alternatively, the image data of the picture taken with the production camera 220 may also be stored in the database 208.

Additionally, once the serial number has been determined (block 312), the production processor 224 is configured to encode the serial number into a visual indicator, for example into a suitable printable format (block 324). In some embodiments, the serial number is encoded into a 2D barcode 120, for example Data Matrix, QR Code, or Aztec Code, while in other embodiments the serial number may be encoded into a base64 string or other encoded format. Finally, the production processor 224 operates the printer 228 to print the serial number, encoded into the 2D barcode 120 or other appropriate printable format, onto the package 100.(block 328) The visual indicator on the package 100, for example the 2D barcode 120, is therefore not a random number or an assigned number, but is instead based on the surface features, for example the fibers and other random elements, of the identification portion 108 of the authentication surface 104.

In some embodiments, the package 100 may be sealed with its contents in such a way that a seal (depicted in FIG. 1 as a dashed line 140) of the package 100 cannot be broken without damaging the identification portion 108. Once the seal is broken and the identification portion 108 is damaged, the link between the serial number and the package 100 can no longer be verified. In such embodiments, the authentication process provides further assurance that the package 100 has not been opened prior to verification of its authenticity, ensuring that the contents inside the package cannot be modified prior to authentication.

FIG. 4 illustrates the verification process 400 for verifying the authenticity of the package 100, which is performed by a "verifier," a term which is used to refer to the party interested in verifying the authenticity of the product. In many instances, the verifier will be the end-consumer, though in some embodiments the verifier may be the retailer or another interested party.

As an optional first step, the verifier may check to ensure that the seal of the package 140 has not been broken (block 404). Next, the verifier uses the verifying portion 212 of the system 200 to read the identification portion 108 and the serial number, which, in this example, is encoded as the 2D barcode 120, on the package 100 (block 408). The verifying processor 244 may operate the verifying camera 240, which may, for example, be the camera on a cellular phone, to capture the image of the barcode 120 and the fingerprint portion 108. Alternatively, a user may operate the camera 240 to capture the image of the barcode 120 and the fingerprint portion 108.

The serial number of the package 100 is then determined from the image of the 2D barcode 120 (block 412). In some embodiments, the verification processor 244 of the verification portion 212 of the system decodes the image of the barcode 120 to determine the serial number. In other embodiments, the captured image of the barcode 120 is uploaded to the database 208, where the database processor 232 decodes the barcode 120.

In some embodiments, the database processor 232 is then configured to check the serial number of the package 100 (block 416). To check the serial number, the database processor 232 determines whether the serial number has been previously queried. If the serial number has already been queried, then the database 208 indicates to the verifier that the package 100 is not authentic by, for example, sending a signal to the verification portion 212 of the system 200, and the process 400 terminates. If the serial number has not been previously queried, the process 400 continues.

The database processor 232 is further configured to derive a feature vector from the image of the identification portion 108 received from the verification portion 212 (block 420). The database processor 232 is configured to derive the feature vector in substantially the same manner as the feature vector was initially determined by the production processor 224. In some instances, however, the feature vector may be noisy due to image distortion, image quality, different image lighting, or poor signal transmission. Any errors in the feature vector may be corrected with the error correcting information stored in the database 208 in block 112 of the production process 100.

Once the feature vector is derived, the database processor 232 re-computes the serial number from the received data in a similar manner as was done in block 312 of the registration process 300 (block 424). The database processor 232 may be configured in one embodiment to use the error correcting information to derive the serial number of the package 100. In another embodiment, the production processor the database processor 232 or the verification processor 244 is configured to generate a hash of the error correcting information to derive the serial number. In yet another embodiment, the database processor 232 or the verification processor 244 is configured to generate a hash of both the error correcting information and the feature vector, or to generate a hash of a combination of a portion of the error correcting information and a portion of the feature vector to generate the serial number.

The database processor 232 then compares the recomputed serial number with the serial number determined from the barcode 120 on the package 100 in block 412 (block 428). If the serial number determined from the barcode 120 and the serial number recomputed from the identification portion 108 are the same, then database replies to the verifier that the package 100 is authentic (block 432) and the process terminates. If the serial number determined from the barcode 120 and the serial number determined from the identification portion 108 do not match, then the database processor 232 replies to the verifier that the package 100 is not authentic (block 436) and the process terminates.

Figure 5:
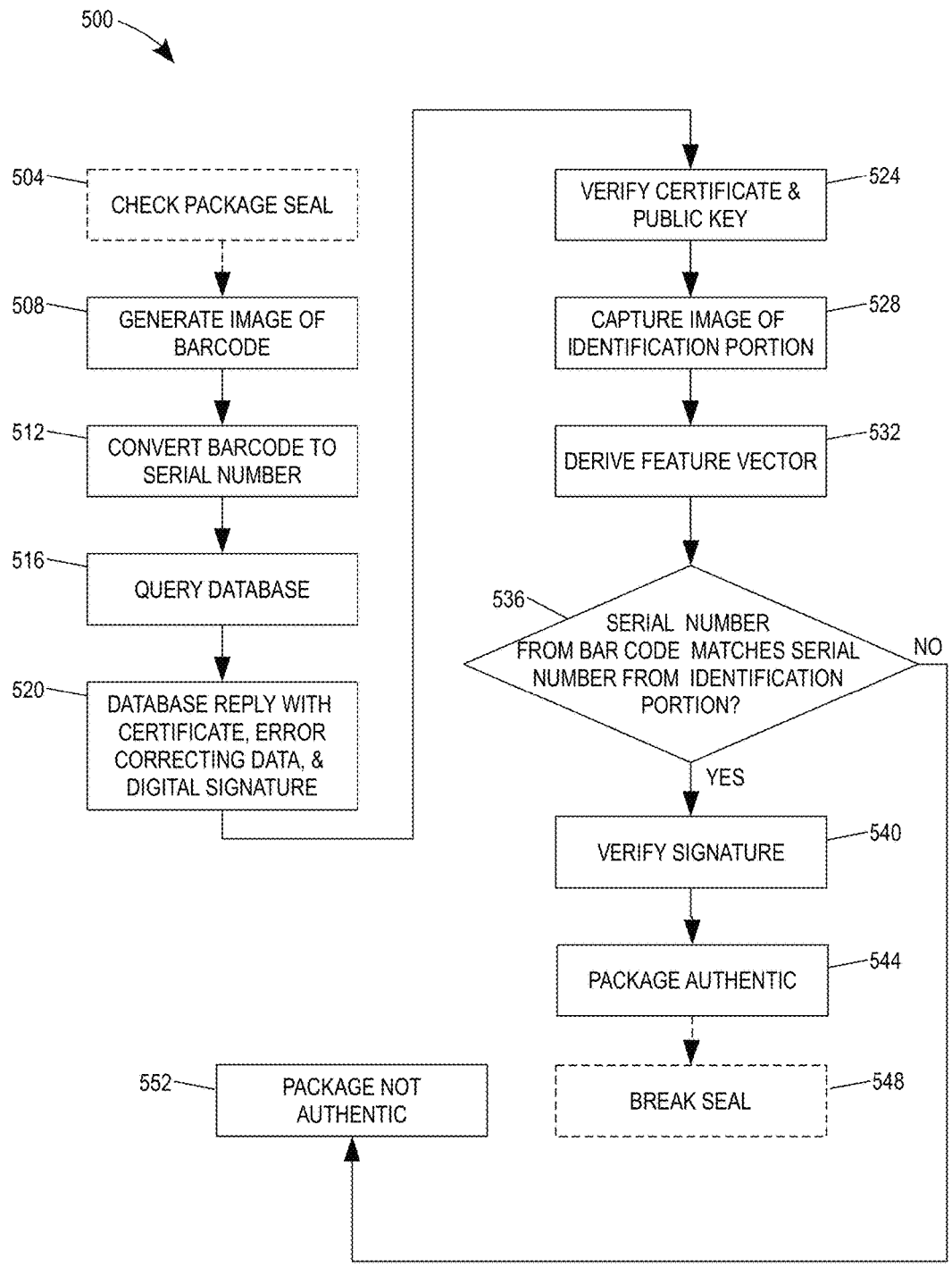
FIG. 5 illustrates another process for verifying a package according to the disclosure.

FIG. 5 illustrates another process 500 for verifying the authenticity of the package 100 using a public key infrastructure (PKI) system. The process 500 is performed by a verifier after the package has undergone a production process, for example the production process 300 described above with reference to FIG. 3. In some embodiments, the process 500 optionally begins with the verifier checking that the seal of the package has not been broken in a similar manner as in block 404 discussed above (block 504).

The verification processor 244 then operates the verification camera 240 to generate an image of the barcode 120 (block 508). The verification processor 244 then converts the barcode 120 to the serial number in a manner similar to block 412 described above (block 512). The verification processor then transmits the serial number along with a random nonce of length at least 80 bits to the database 208 (block 516). Querying the database with the random nonce prevents the serial number from being intercepted for subsequent re-use.

The database processor 232 receives the serial number and the random nonce from the verification processor 244 and replies to the verification processor 244 (block 520). The reply includes a certificate with the public key of the database, confirming that the communication is being performed with the trusted certificate authority. Alternatively, if no certificate is available from a certificate authority, the verification processor 244 is configured to verify that the public key information is obtained from a trustworthy source. The reply from the database 208 also includes the error correcting data stored during the production phase, along with a digital signature on the error correcting data, the serial number received, and the nonce from the verifier.

The verification processor 244 then verifies that the certificate and public key are authentic and correspond with the content manufacturer (block 524). Next, the verification processor 244 operates the verification camera 240 to generate an image of the identification 108 portion of the package by illuminating from the front or back of the package surface (block 528). In some embodiments, the image of the identification portion 108 is generated at the same time as the image of the barcode in block 508, while in other embodiments the image of the identification portion is determined at another time earlier in the process 500.

The verification processor 244 is configured to derive a feature vector from the image, correcting any errors in the derivation of the feature vector with the error correcting information received from the database 208 in a similar manner as in block 420 of process 400 (block 532).

The verification processor 244 then compares the serial number with the feature vector obtained in block 532 to verify that the serial number corresponds with the feature vector received from the database 212 in block 520 (block 536). If the two serial numbers match, the verification processor 244 confirms that the signature on the error correction data, the serial number, and the nonce are genuine (block 540). Once verified, the verification processor indicates that the package 100 is authentic (block 544). Optionally, the verifier may then break the seal linking the package to its contents so that the package cannot be subsequently re-used or re-verified (block 548). If, in block 536, the two serial numbers do not match, the verification processor 244 indicates to the verifier that the package is not authentic (block 552).

In the present disclosure, a unique serial number, which depends on the unique physical properties present on a surface of the package, is printed on the package itself. The unique serial number is used for applications such as tracking, tracing, and authenticating the package. The link between the physical properties of the package and the unique serial number is advantageously used to verify that the serial number corresponds to the particular package. Since the unique serial number depends on random physical features of the package that cannot reasonably be reproduced, the serial number and the physical features of the package provide a robust approach to determine the authenticity of the package.

Figure 6:
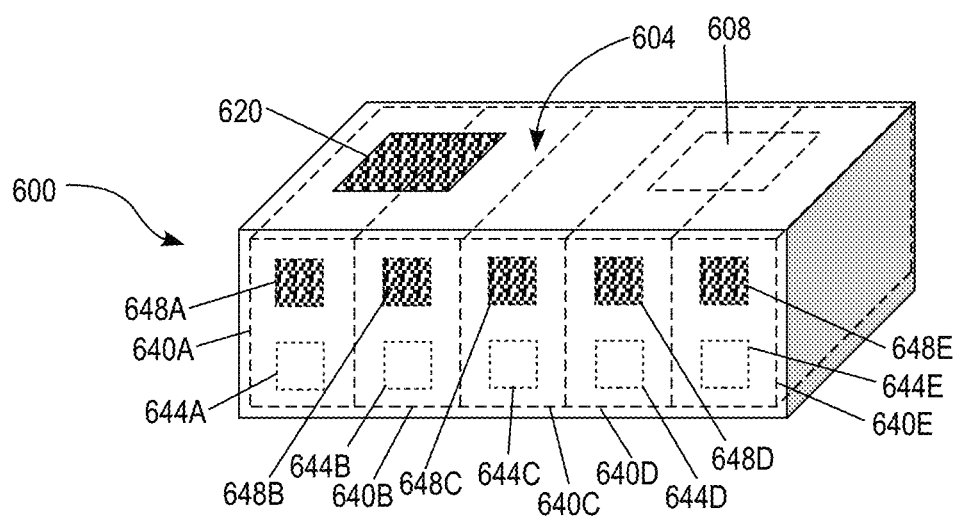
FIG. 6 illustrates a side perspective view of an outer package according to the disclosure having a plurality of smaller packages packed inside the outer package, with the outer package having a barcode based on surface features of both the outer package and the smaller packages packed inside the outer package.

FIG. 6 illustrates another embodiment of a package 600, which has recursive authentication features. The package 600 has an authentication surface 604, on which an identification portion 608 is located. The package 600 also includes a barcode 620, which is configured in the illustrated embodiment as a two-dimensional QR code, printed or otherwise affixed to the package 600.

The package 600 is configured to store a plurality of smaller packages 640A-E, also referred to herein as sub-packages, for transport and/or sale. Each of the smaller packages 640A-E also includes a respective identification portion 644A-E and a respective barcode 648A-E. As in the package 100 described above, the barcode 648A-E on each of the smaller packages 640A-E is based on the surface features present in the respective identification portion 644A-E of the smaller package 640A-E.

In a similar manner as the package 100 described above, the barcode 620 of the package 600 is based on the surface features present in the identification portion 608 of the authentication surface 604. In addition, the barcode 620, in some embodiments, is based on the barcodes 648A-E and/or the surface features of the identification portions 644A-E of the smaller packages 640A-E located within the package 600. For example, a portion of the barcode 620 may represent a hash of the serial numbers derived from each of the identification portions 644A-E of the smaller packages 640A-E. The barcode 620 is therefore based not only on the surface features of the identification portion 608 of the outer package 600, but also the surface features of the identification portions 644A-E of the smaller packages 640A-E packed into the outer package 600.

To authenticate the package 600, the verifier would scan or take a picture of the barcode 620 and of the identification portion 608 of the outer package 600. The package 600 would then be opened, and each of the smaller packages 640A-E would be verified in a manner similar to the verification of the package 100 described above in FIG. 4 or FIG. 5. The verification processor or the database processor is then configured to generate a hash of the feature vectors of the smaller packages 640A-E and of the feature vector of the identification portion 608 of the outer package 600. If the hash generated based on the feature vectors of the smaller packages 640A-E and the feature vector of the identification portion 608 matches the serial number represented in the barcode 620 on the outer package 600, the outer package 600 is successfully verified.

In the embodiment of FIG. 6, therefore, a recursive authentication of the package is provided. The smaller packages 640A-E are all verified by the process discussed above with regard to FIG. 4 or FIG. 5 to ensure that they are authentic. Additionally, the outer package 600 is verified to ensure the authenticity of not only the outer package 600, but also the smaller packages 640A-E inside the outer package 600. Moreover, the recursive process enables detection of whether the smaller packages 640A-E have been tampered with and if the smaller packages 640A-E do not belong in the outer package 600.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A package comprising:
 a first substrate having a first surface with a first identification portion;
 a plurality of sub-packages packed inside the package, each sub-package including a second surface with a respective second identification portion; and
 a first serial number attached to the package, the first serial number being based on at least one first surface feature in the first identification portion and at least one second surface feature of each of the respective second identification portions of the plurality of sub-packages.

2. The package of claim 1, wherein the package is sealed such that opening the package damages the at least one first surface feature in the first identification portion.

3. The package of claim 1, wherein the first serial number is printed on the package.

4. The package of claim 1, wherein each of the plurality of sub-packages includes a second serial number attached to the sub-package, the second serial number being based on the respective second identification portion of the sub-package.

* * * * *